Jan. 6, 1970 W. E. MARTIN 3,487,564
REAR-DUMPING SELF-LOADING VEHICLE
Filed Feb. 16, 1967 2 Sheets-Sheet 1
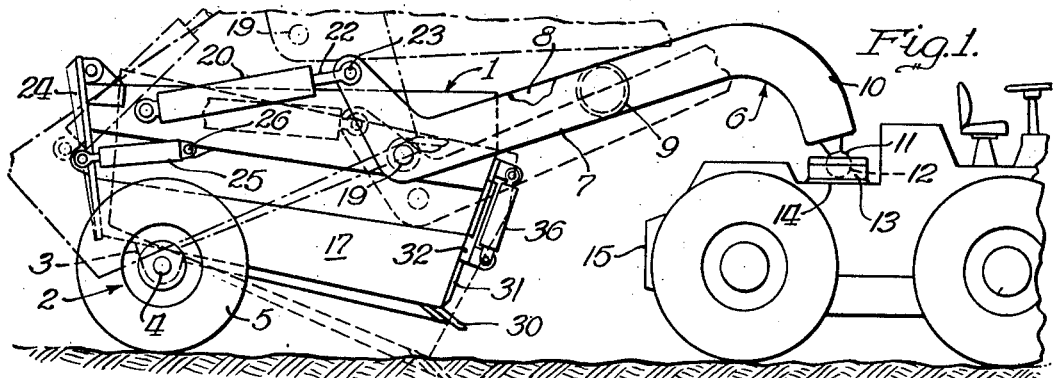
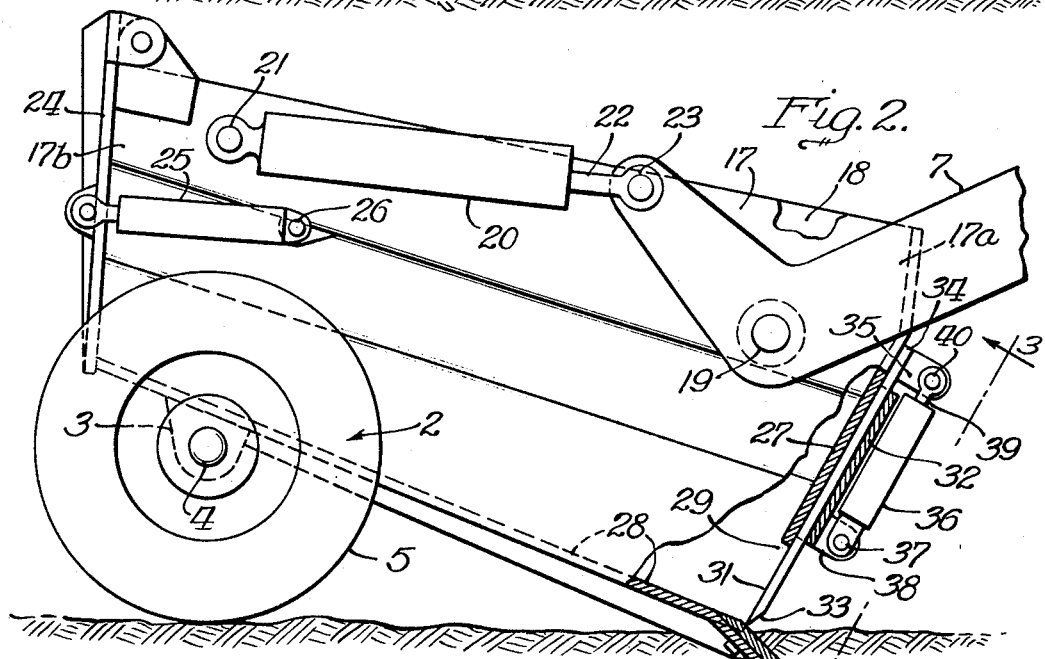
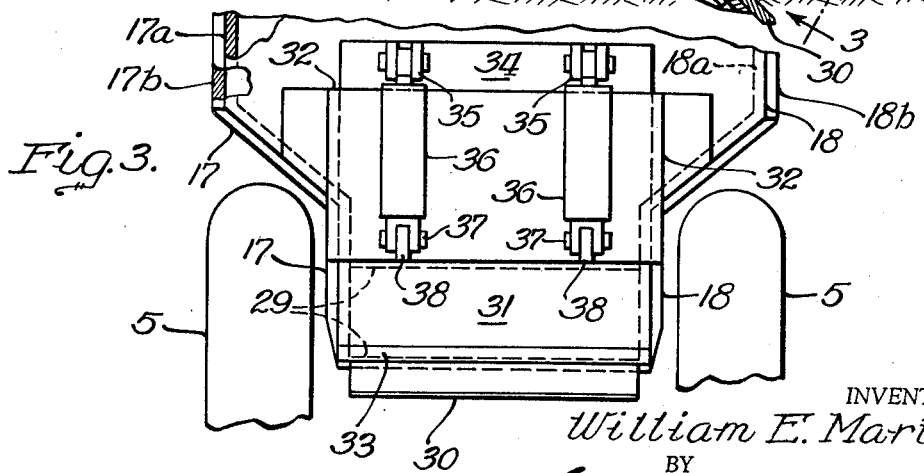
INVENTOR:
William E. Martin
BY
Eberhard E. Wetty
Atty.

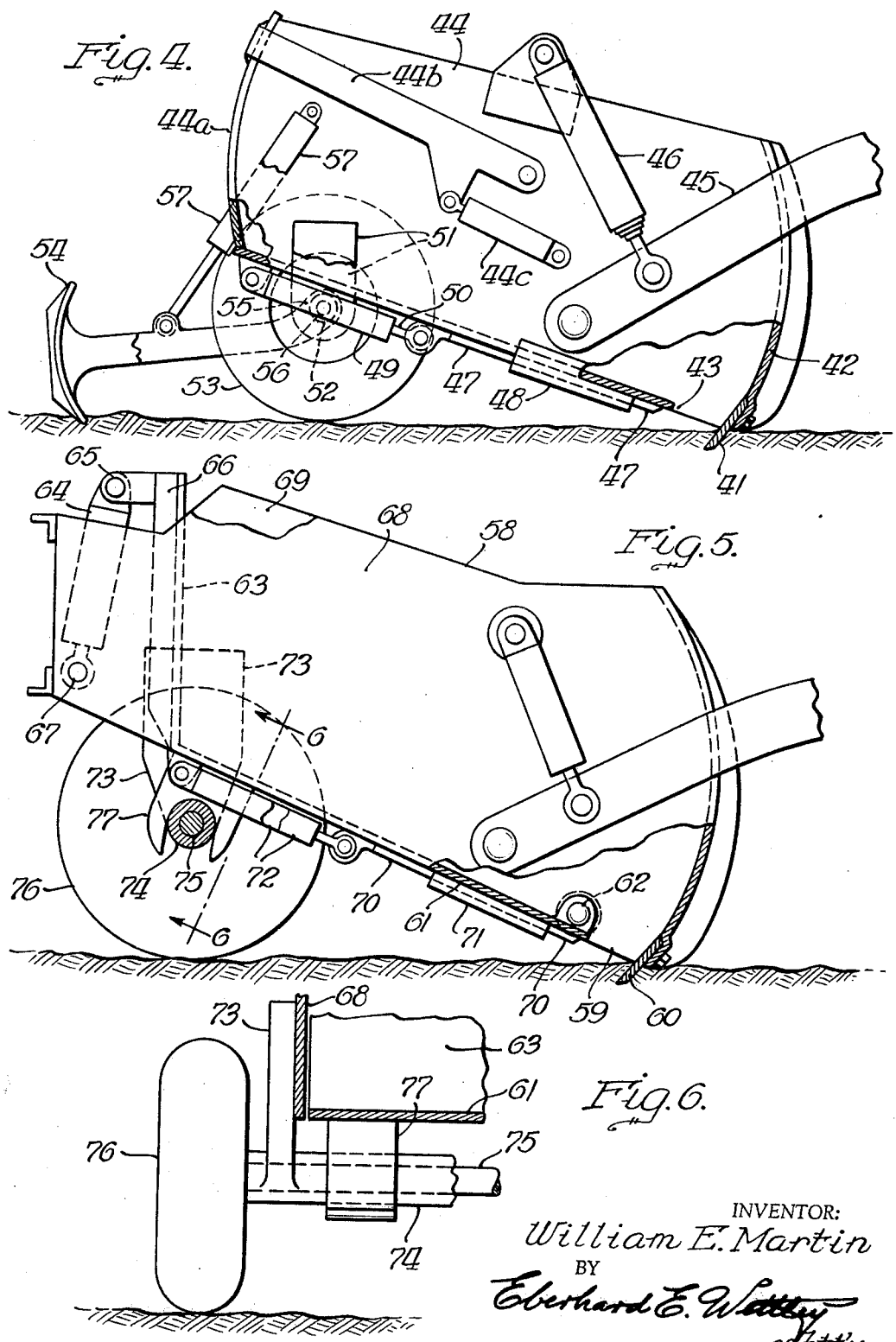

United States Patent Office 3,487,564
Patented Jan. 6, 1970

3,487,564
REAR-DUMPING SELF-LOADING VEHICLE
William E. Martin, c/o Martin Co., P.O. Box 187,
Kewanee, Ill. 61443
Filed Feb. 16, 1967, Ser. No. 616,554
Int. Cl. E02f 9/00
U.S. Cl. 37—129        13 Claims

ABSTRACT OF THE DISCLOSURE

A self-loading dump truck with material feed or flow control entry means at the loading opening of the material carrying bowl together with dumping discharge and height control means for the bowl in the form of hitch and cylinder mechanism attachable with a power vehicle to maneuver the dump truck vehicle and to also elevate the bottom wall of the dump truck to such a degree as to exceed the angle of repose of material carried therein to insure gravity dumping of the same.

---

This invention relates to a self-loading dump truck as a trailer hauling and distributing vehicle that is adapted to various earth or material moving functions, as for example, in construction work and for road building.

More specifically, this invention is directed to a material moving and handling facility that is readily attached to or released from a power or tractor vehicle by means of a hitch and cylinder combination functioning to regulate the operation of the material carrying bowl of the truck together with a gate controlled bowl loading entrance opening and a bowl cutting blade means at said opening to direct material into the carrying bowl, said bowl having a cylinder controlled endgate through which material is discharged where and when needed.

It is an object of this invention to provide an upright walled truck bowl with an endgate control discharge facility and a bowl that is wheel supported at one end portion thereof and which has a hitch assembly pivotally connected with the bowl walls in a location spaced from the wheel location for attachment with a power or tractor vehicle, such bowl and hitch assembly being joined by hydraulic cylinder means to raise and lower the loading end of the bowl in relation to the power vehicle and to the ground by fulcruming the bowl upon the axle of the supporting wheels, said bowl, hitch and the cylinder means also functioning to dump the bowl for discharging the load.

For added flexible manipulation of the wheeled bowl the hitch is provided with a suitable universal attachment assembly for releasable connection with the power vehicle and to permit the truck bowl to rock laterally or fore and aft to follow the deviations of or contour of the surface being worked and to permit the bowl and wheel assembly to follow surface undulations along the line of travel negatiated by the joined units.

Another object is to provide a hitch and cylinder regulated wheel carried bowl which is made with fixed side and front walls including a swingable endgate structure all disposed over a rigid bottom wall joining the peripheral walls mentioned to create a material carrying bowl rockably mounted upon its wheel means and one having a material receiving opening at its freely swingable end at the juncture of its forward and bottom walls for the passage of material into the bowl chamber.

In addition to the above-mentioned bowl structure, it is an object to provide the bowl with a cutting edge disposed in a given relation to the bowl opening to direct or to divert material into the bowl through its opening as the wheel carried bowl is being drawn in a given direction by the power vehicle to which the self-loading dump truck is attached. In this connection, the bowl, its opening and the location of the cutting blade are cooperatively arranged to automatically fill the bowl in one embodiment upon forward travel of the joined vehicles and to fill the bowl in another embodiment upon rearward travel of the vehicles when the bowl is being pushed by the power vehicle.

Another object is to provide a sliding gate arrangement to open and to close the material entry opening of the bowl between fully open or fully closed positions as well as in any intermediate positions for material flow control into the bowl opening during the manipulation of the tandem vehicles on the road or surface be worked.

A further object is to provide a variable height material spreader for the bowl to precede the approaching cutting blade when considering that the direction of motion is such as to cause material leveling ahead of the cutting blade for better and more efficient and uniform material entry into the bowl opening across the full width of the cutting blade, such spreader also providing leveling means for the material when it is being discharged through the endgate and out of the bowl.

A still further object, however, is to provide such a self-loading dump truck with a bowl having a swingable movable bottom pivotally supported at the bowl opening to swing between the bowl sides for quicker material discharge and wherein the swinging bottom also includes a sliding gate means to regulate material flow into or out of the bowl opening to meet various conditions of operation.

All other objects and advantages relating to the herein disclosed invention shall hereinafter appear in or become evident from the following detailed description of the self loading and material distributing dump truck having reference to the accompanying drawings forming a part of this specification.

In the drawings:

FIG. 1 is a side elevational view of the dump truck assembly as it would appear when it is operatively attached to a towing power or tractor vehicle;

FIG. 2 is an enlarged view of the dump truck per se with certain portions thereof broken away and shown in section to show constructional details, the bowl being illustrated in a lowered and operative working position under the control of the cylinder and hitch means mounted on the towing vehicle;

FIG. 3 is a fragmentary face view of the loading end portion of the bowl with certain parts broken away and in section and as generally viewed along the line 3—3 in FIG. 2;

FIG. 4 is a side elevational view of a bowl structure of the present invention comprising a modified construction, this being a pusher type of unit for loading the bowl in contrast to the pulled type unit as shown in FIGS. 1 to 3, the modified unit of FIG. 4 also including a cylinder operated surface spreader that functions as a leveling means;

FIG. 5 is a side elevational view of another modified arrangement of bowl structure utilizing a swingable bowl bottom for load discharge purposes; and FIG. 6 is a fragmentary detailed transverse sectional view taken along the line 6—6 in FIG. 5 to better illustrate certain details of construction of the bowl in FIG. 5.

The arrangement illustrated in FIGS. 1, 2 and 3 is a combination of a wall enclosed material carrying truck body which will be identified as having a bowl 1 that is supported for mobility upon a wheel means 2 with a bearing member 3 on an axle 4 of the wheels 5 to provide a fulcrum structure about which the bowl 1 may freely rock to cause the forward free swingable bowl end to move between raised transport position and certain lowered operative loading positions or to be actuated into dumping position to carry out its earth working and moving functions.

The elevation control for the free bowl end is provided through a forked hitch unit 6 having side arms 7 and 8 joined by a cross tube 9 that carries a central single hitch bar 10 that is pivotally connected at a given reference point of support such as the fulcrum location established by the hitch ball 11 and ball socket 12 supported on a bracket 13 which is releasably attached at 14 to the power vehicle or tractor vehicle 15. This attachment assembly furnishes a universal action at the point of connection for the bowl hitch to accommodate tilting and pitching motions of the dump truck as it travels over the surface being worked and the ball 11 and socket 12 on this assembly designate a given point of support as mentioned above for the hitch beyond the front end of the bowl and in a location between the fore and aft wheels of the vehicle 15 for greater stability.

The rear ends of the side arms 7 and 8 of the hitch 6 are pivotally joined with the side walls 17 and 18 of the bowl on aligned bearing members or shafts 19 located intermediate the length of the bowl. A hydraulic control cylinder 20 is provided at each side of the bowl to join the bowl and hitch. Each cylinder 20 is pivotally connected with the bowl at 21 and its ram 22 is pivoted on a stub shaft 23 carried by the dual arms 7 and 8 of the hitch unit 6 to thereby provide a three point locking mechanism identified by the pivotal members 21, 23 and 19. By the manipulation of cylinder 20, the angular relationship of the hitch to the bowl is altered so that the bowl assumes a different angular position in relation to the wheel means 2 and also as set up by the reaction of the hitch means 6 upon its forward elevated support and reference point on the power vehicle.

The hitch and cylinder arrangement just described further provides a convenient and efficient mechanism for making the bracket connection with a power vehicle. With the free end of the bowl resting on the ground the cylinder 20 can raise or lower the hitch 6 to bring the bracket 13 to securing elevation.

The bowl 1 is a closed receptacle comprising the peripheral upright walls including the side walls 17 and 18, a swingable endgate 24 operated by cylinder 25 pivoted on the bowl at 26 and front wall 27 all located above the bottom 28 lying over the bearing member 3. For material access and discharge into and out of the bowl, a suitable transverse opening 29 is located at the juncture of the front and bottom walls 27 and 28. A cutting blade 30 is secured across the bowl at one marginal portion of the opening 29 to direct or deflect material into the bowl 1 through the opening 29 as the trailing dump truck is moved by the power vehicle 15. In the unit shown in FIGS. 1 and 2, material is fed into the bowl through forward motion of the trailing truck with the forward movement of the pulling vehicle.

For further material flow and material quantity control, a sliding gate 31 is positioned for closing or uncovering the opening 29 or to vary the amount of the opening 29 for material feed control. Gate 31 is slidable in a guide member 32 and has a cutting closure edge 33 and an extended upper edge 34 with one or more ears 35. One or more hydraulic cylinders 36 are connected with pins 37 on ears 38 secured to the guide member 32 and the cylinder rams 39 connected with pins 40 carried by the gate ears 35 whereby simultaneous operation of the cylinders 36 move the gate 31 into positions selected by the operator to best serve the particular conditions of operation. Gate 31 is shown in closed positions in FIGS. 1, 2 and 3. By raising gate 31 in FIG. 2 and setting the vehicles in motion, material will be directed into the bowl over the cutting blade 30. When the bowl is filled as desired, the cylinder-hitch means can raise the same into the full line raised position in FIG. 1 for transport and subsequent distribution. By varying the tilt of the bowl on the axle 3, different blade depths can be provided for light or heavy material feed into the bowl. Such a selected feed can also be regulated by the gate if desired, but the gate opening control is primarily useful in controlling the material feed into the bowl at the point of material loading under operation. Material discharge is made out of the end gate 24 with the bowl tilted into a position as indicated by the dot and dash lines in FIG. 1.

It should be noted as shown in FIG. 3 that the bowl 1 is hopper shaped which makes the loading and blade portion narrower and provides for a large capacity bowl to carry various materials. The side walls 17 and 18 are made to taper oppositely outwardly from the front to the rear or wheel end of the bowl to facilitate easier load discharge under dumping action out of the endgate part of the bowl. FIG. 3 shows the taper of wall 17 from 17a at front wall 27 to a location of 17b at the endgate end of the bowl, with wall 18 tapering from 18a to 18b in the same fashion.

In general, the FIG. 4 arrangement is similar to the construction described except that this modification is made for a push type operation wherein a blade 41 is provided on the forward wall 42 adjacent the bowl entrance opening 43 with the bowl 44 being rockably regulated by the hitch 45 and cylinder 46 as in the first form of the invention above described. A gate 47 is slidable and mounted in a guide member 48 and a cylinder 49 is arranged with its ram 50 connected with the gate 47 to thereby regulate the size of the opening 43 under operative conditions.

Separate suitable bearing brackets 51 are here provided on the opposite sides of the bowl to support stub axles 52 for the wheels 53 to establish clearance under the bowl for the gate operating cylinders. In other respects the general bowl structure is like the first construction.

FIG. 4 discloses one additional feature by incorporating a material spreader such as 54 that is swingably mounted at 55 on suitable axle extensions 56 and which is vertically adjustably regulated by hydraulic cylinders 57 in relation to the ground as well as lifted out of the way upon bowl raising into transport position. This spreader operates in a position ahead of the bowl filling station or point and levels the ground or surface material for better bowl enerance feed across the full width of the blade 41 and into the transverse bowl opening 43.

A vertically operable endgate or apron 44a is mounted on the bowl side walls with arms 44b and this endgate is controlled by means of a cylinder 44c to regulate material discharge at the dumping end of the bowl 44. This discharged load material can also be spread or leveled by the spreader 54 when the bowl is towed forwardly or to the right as viewed in FIG. 4.

FIGS. 5 and 6 portray a bowl 58 having an opening 59 with a blade 60 and which bowl is equipped with a swingable bottom 61 which is pivoted at 62 next to the bowl opening 59. The bottom terminates with an upright rear wall 63 and one or more hydraulic cylinders 64 are connected at 65 with a rear wall bracket 66 and with the side bowl walls at 67 to raise and to lower the swinging bottom 61 and its attached wall 63 between the side walls 68 and 69 of the material hauling bowl 58.

A sliding gate 70 is mounted on the bottom by guides 71 and cylinders 72 provide the means to move the gate as needed, such sylinders also being carried by the bowl bottom 61. The present construction uses side wheel supports such as 73 mounted on the bowl sides to carry a cross sleve 74 for the axle 75 of the wheels 76. The bowl bottom has one or more bolsters 77 that rest upon the sleeve 74 when the bottom 61 is fully down for the loading of material or for the transport of material. The bottom 60 is raised from this position to augment and encourage the discharge and distribution of material through the opening 59 of the material hauling bowl 58.

What I claim is:
1. A self-loading dump truck comprising; a material carrying bowl defined by a bottom load supporting wall, fore and aft end walls and a pair of side walls; wheel means for said bowl; bearing means rockably mounting the aft end portion of said bowl upon said wheel means for swinging movement of the fore end portion thereof across a plane extending through said bearing means and substantially parallel to the axis of said swinging movement; a hitch mechanism including a hitch member pivotally mounted adjacent the forward end portion of each of said side walls and extending forwardly thereof for coupling attachment with a power vehicle adapted to move said bowl; said bowl including a bowl opening adjacent the forward and bottom wall ends; a material cutting blade rigidly disposed at one marginal edge of said bowl opening to deflect and direct material into said bowl upon movement of the bowl by said power vehicle through said hitch mechanism; and fluid cylinder means operatively interconnecting said side walls and said bottom wall for defining a plurality of angular adjustments of said bottom wall relative to said plane including a first downwardly and forwardly inclined loading position wherein said cutting blade underlies said plane, a second carry position upwardly inclined relative to said loading position and wherein cutting blade overlies said plane and a third dumping position wherein said cutting blade overlies said plane and wherein the angular position of said bottom wall in said dumping position substantially exceeds the angle of repose of the material carried by said bowl to thereby insure gravity dumping of the same, and said fluid cylinder means including a pair of fluid cylinders interconnected between said side walls and the hitch members for producing relative vertical movement therebetween, said pair of fluid cylinders enabling the forward end of said hitch mechanism to be elevated relative to said bowl to facilitate coupling attachment with a power vehicle.

2. In the combination defined and set forth in claim 1, with the provision of a slidably carried gate mounted on a wall of said bowl to open or close the bowl opening including at least one power cylinder on said last named bowl wall connected with said gate to regulate the position of said gate in relation to the bowl opening.

3. In the combination defined and set forth in claim 1 wherein said hitch mechanism includes an universal connecting means at its forward coupling end having a securing bracket for attachment with said power vehicle.

4. In the combination of claim 1 wherein the hitch members are pivotally connected with the opposite side walls of the bowl on aligned pivotal units and have at least one forward arm terminating beyond the bowl for coupling with said power vehicle, and said pair of fluid cylinders further establishing a locking arrangement between said hitch mechanism, cylinders and bowl.

5. In the combination of claim 4 with the addition of a universal coupling on the one forward arm and having a bracket adapted for attachment with the power vehicle, said universal means providing reactive reference point for hitch support and for cooperation with said locking arrangement.

6. In the combination of claim 1, with the addition of a spreader movably mounted on the bowl in advance of the cutting blade of the bowl to spread surface material before blade contact, and control mechanism carried by the bowl and connected with the spreader to raise and lower said spreader to meet conditions of operation.

7. In the combination of claim 1, wherein the bowl opening is in the forward wall of the bowl and the cutting blade is mounted in a forwardly and downwardly position at said opening to provide for loading operation upon forward motion of the same.

8. In the combination of claim 1 wherein the bowl opening is in the bottom wall of the bowl and the cutting blade is disposed in a rearward and downward angle at said opening to provide a dump truck bowl adapted for loading operation in a rearward direction with the power vehicle pushing the dump truck.

9. In the combination of claim 1, wherein the bowl bottom is pivotally mounted on the bowl adjacent the bowl opening for swinging motion between the side walls of the bowl, and said fluid cylinder means further includes cylinders pivotally interconnecting said bowl side walls and said bowl bottom to raise and lower said bottom with respect to said bowl.

10. In the combination set forth and defined in claim 9 wherein a gate is slidably mounted on the movable bottom to open and close the bowl opening and cylinder means on said bottom connect with said gate for the operative actuation thereof.

11. In the combination set forth and defined in claim 9 wherein said movable bowl bottom is provided with bolster members arranged to seat upon the wheel means structure while said bowl is in loading or transport position.

12. In the combination set forth and defined in claim 1, wherein said bowl side walls are oppositely outwardly inclined longitudinally of the bowl to provide a narrower bowl section adjacent said bowl opening and a wider bowl section at the other end of said bowl for discharge of material therefrom.

13. In the combination set forth and defined in claim 12, including a power controlled endgate structure mounted on the material discharge end of the bowl of the dump truck which is the wider section of the bowl.

References Cited

UNITED STATES PATENTS

| | | | |
|---|---|---|---|
| 2,061,924 | 11/1936 | Slate | 37—129 XR |
| 2,083,307 | 6/1937 | Schultz | 37—129 |
| 2,304,076 | 12/1942 | Davidson et al. | 37—126 |
| 2,545,739 | 3/1951 | Martin | 37—126 XR |
| 2,565,850 | 8/1951 | Hyler et al. | 37—129 |
| 2,567,534 | 9/1951 | Whittier | 37—129 |
| 2,691,835 | 10/1954 | Mason | 37—129 |
| 2,718,718 | 9/1955 | Bartlett | 37—126 |
| 2,841,898 | 7/1958 | Sampson | 37—129 XR |
| 2,888,758 | 6/1959 | Allin | 37—126 |
| 2,965,988 | 12/1960 | Monk | 37—126 |
| 3,030,714 | 4/1962 | Sassmann et al. | 37—126 |
| 3,049,819 | 8/1962 | Cohron et al. | 37—129 |
| 3,088,383 | 5/1963 | Ekstrom | 37—126 XR |
| 3,200,520 | 8/1965 | Nicholls | 37—129 |
| 3,235,985 | 2/1966 | Lauster | 37—117.5 XR |

EDGAR S. BURR, Primary Examiner